United States Patent [19]

McVey

[11] Patent Number: 4,486,143

[45] Date of Patent: Dec. 4, 1984

[54] TURBINE-TYPE WIND MACHINE

[76] Inventor: Paul W. McVey, 4039 Grennoch La., Houston, Tex. 77025

[21] Appl. No.: 413,667

[22] Filed: Sep. 1, 1982

[51] Int. Cl.³ ............................................. F03D 3/04
[52] U.S. Cl. .................................. 415/2 R; 415/162
[58] Field of Search ............................. 415/2–4 R, 415/2–4 A, 162, 165, 151, 159, 216

[56] References Cited

U.S. PATENT DOCUMENTS

| | | | |
|---|---|---|---|
| 63,498 | 4/1867 | Gallup | 415/2 R X |
| 94,624 | 9/1869 | Maxwell | 415/4 R |
| 194,822 | 9/1877 | Howard | 415/2 R X |
| 232,558 | 9/1880 | Smith | 415/4 R |
| 294,943 | 3/1884 | White | 416/119 X |
| 588,572 | 8/1897 | Hardaway | 415/2 R X |
| 640,901 | 1/1900 | Hardaway | 415/2 R X |
| 667,965 | 2/1901 | Barwis | 416/119 X |
| 683,935 | 10/1901 | Hensel | 416/DIG. 6 X |
| 864,789 | 9/1907 | Kickoush | 415/3 R |
| 1,008,148 | 11/1911 | Hibbs | 415/18 |
| 1,382,591 | 6/1921 | Ackermann | 415/4 R |
| 1,463,924 | 8/1923 | Ozaki | 415/2 R |
| 1,503,061 | 7/1924 | Pendergast | 415/2 R X |
| 1,592,417 | 7/1926 | Burke | 415/2 R X |
| 1,595,578 | 8/1926 | Sovereign | 415/2 R X |
| 1,636,449 | 7/1927 | Adams | 415/2 R X |
| 3,938,907 | 2/1976 | Magoveny et al. | 415/2 R X |
| 3,994,621 | 11/1976 | Bogie | 415/2 R X |
| 4,415,814 | 11/1983 | Parra | 415/2 R |

FOREIGN PATENT DOCUMENTS

| | | | |
|---|---|---|---|
| 494602 | 1/1977 | Australia | 415/3 R |
| 380643 | 10/1907 | France | 415/2 R |
| 515331 | 3/1921 | France | 415/2 R |
| 104579 | 8/1980 | Japan | 415/3 R |
| 1025 | of 1908 | United Kingdom | 415/2 R |
| 188653 | 3/1923 | United Kingdom | 415/2 R |
| 558929 | 1/1944 | United Kingdom | 415/3 R |

OTHER PUBLICATIONS

WO 8103683; Dec. 1981.

Primary Examiner—Everette A. Powell, Jr.

[57] ABSTRACT

A wind machine which includes turbine assemblies arranged in superposed relationship and wherein the turbine assemblies may vary in size and number in accordance with power requirements, together with a plurality of deflector panels or sails associated with the turbine unit of each assembly for directing the wind to selected areas of the driving vanes of each turbine unit and at the same time shielding from the wind other areas of driving vanes which would tend to interfere with desired rotation of the turbine unit. The deflector panels or sails also accurately controlling the volume of air which bypasses each panel or sail to thereby prevent "stacking" or turbulence adjacent the driving vanes of the turbine unit. The panels also being arranged to recapture the major portion of the bypassed air and direct it back into the turbine unit which increases efficiency of operation.

7 Claims, 16 Drawing Figures

TURBINE-TYPE WIND MACHINE

This invention relates to new and useful improvements in turbine-type wind machines.

BACKGROUND OF THE INVENTION

As is well known, wind is a source of energy which is limitless in supply and available and dependable substantially all of the time. Its average speed and force at any given location can be predicted with reasonable accuracy. However, in spite of this, wind as a source of energy has not been utilized to its fullest extent.

For generations, wind machines such as the windmill have been employing principles and practices in their construction and operation which are most inefficient. These prior machines have primarily depended upon restricting the action of the wind upon the unit to prevent damage to its structure. Such restriction in the case of windmills is accomplished by feathering the blades or by adjusting them so the wind merely blows past or between them. Rotating turbines have been used but they too have depended upon restricting or dumping a portion of the available air to protect the structure and in some instances, to also control the speed. Obviously, a wind machine, whether of the windmill blade type or the rotating turbine-type having vanes cannot operate efficiently if the maximum volume of available wind is not directed to the blades or vanes.

THE PRIOR ART

For many years, attempts have been made to construct efficient turbine-type wind machines and as early as 1917, the Solomon U.S. Pat. No. 1,234,405 was issued. This patent discloses a "windmill" in which several turbines are assembled on a single shaft. An annular deflector surrounds the turbine and its blades direct the wind against certain of the turbine vanes. However, no provision is made for preventing the air from flowing past the vanes or from acting upon other vanes which will tend to rotate the turbine in a direction opposite to the desired direction.

The Pendergast U.S. Pat. No. 1,503,061, issued in 1924, provides a vertically disposed rotating "windwheel" which is located within the center of a concrete tower. Control of the air which enters through tapered air concentrating passages is effected by shutters or vanes, all of which operate simultaneously so that all shutters are in the same position. No attempt is made to prevent the incoming air from "building up" or "stacking" and thereby creating greater turbulence as it enters the windwheel chamber.

Vertically disposed curved vanes in a turbine wind machine are disclosed in the Fortier-Beaulieu U.S. Pat. No. 1,519,447 also issued in 1924. Other examples of the use of curved vanes in a turbine-type wind machine are illustrated in the U.S. Pat. Nos. to Sovereign 1,595,578 (1926), Magoveny, et al (1976), Bogie 3,994,621 (1976) and Ewers (1979).

However, none of these prior patents have effectively solved the problem of accurately controlling the air volume acting against the vanes of the turbine whereby maximum efficiency of operation is assured.

OBJECTS OF THE INVENTION

It is therefore one object of this invention to provide a turbine-type wind machine which will produce maximum power from the wind acting upon the turbine vanes.

An important object is to provide a turbine-type wind machine having deflector members or sails which by reason of their size and arrangement increase the volume of air available to act upon the turbine vanes while at the same time shielding from the wind that area of the turbine which would resist the proper direction of rotation.

Another object is to provide a wind machine having a rotatable turbine wherein a plurality of deflector members or sails are so located with respect to the vanes of the turbine that whenever the air volume exceeds that which can efficiently act upon the vanes, the excess air is allowed to pass or escape beyond the particular sail positioned in that area but thereafter said excess air is again trapped by the next adjacent sail and directed against the turbine vanes.

A further object of the invention is to provide a turbine-type wind machine of the character described, wherein the deflector members or panels are adjustable with respect to the vanes of the turbine, whereby the direction, angle and spacing of said members with respect to the vanes of the turbine, as well as the amount of their areas which are exposed to the wind may be changed to suit the particular wind conditions and thereby obtain maximum efficiency.

A particular object is to combine a turbine-type wind machine with apparatus at ground level which utilizes the torque produced by the machine to perform the desired work; said ground apparatus also including an accumulator wheel which stores excess torque during periods of above-normal wind speeds so that said stored torque may be used for limited continuing operation when wind speed is less than normal.

A still further object is to provide a wind machine wherein the turbine units are mounted vertically one above the other on a common shaft which minimizes the ground space needed for the machine. The machine permits the combining of any number of turbine units of the same size or of different sizes in accordance with the power desired to be developed by the torque in the common shaft, which torque will perform work through well known apparatus such as shafts, gears, torque converters and the like.

A specific object of the invention is to provide a wind machine of the character described which is simple to manufacture in any fabricating shop because it requires no specialty, one-purpose tools such as stamps or dies.

Other objects and advantages of the present invention are hereinafter set forth and are explained in detail with reference to the drawings wherein:

DESCRIPTION OF THE PREFERRED EMBODIMENT

In the drawings, the letter A designates a vertically extending supporting structure which includes an inner tower A-1 and an outer tower A-2. The towers each have suitable foot pads B which engage the ground G. A plurality of turbine assemblies T are supported within the inner tower and are connected with a central one-piece shaft 10 which is preferably square in cross-section, extending throughout the length of said inner tower. The lower end of the shaft has a connection C which couples the shaft to apparatus D or machinery to be driven, which apparatus is located in a suitable housing H at the base of the inner tower A-1. As will be explained, the wind drives the turbines of the assemblies which rotate the shaft 10 to actuate or drive the apparatus or machinery D.

THE SUPPORTING STRUCTURE

Figures 3, 4, 4A:
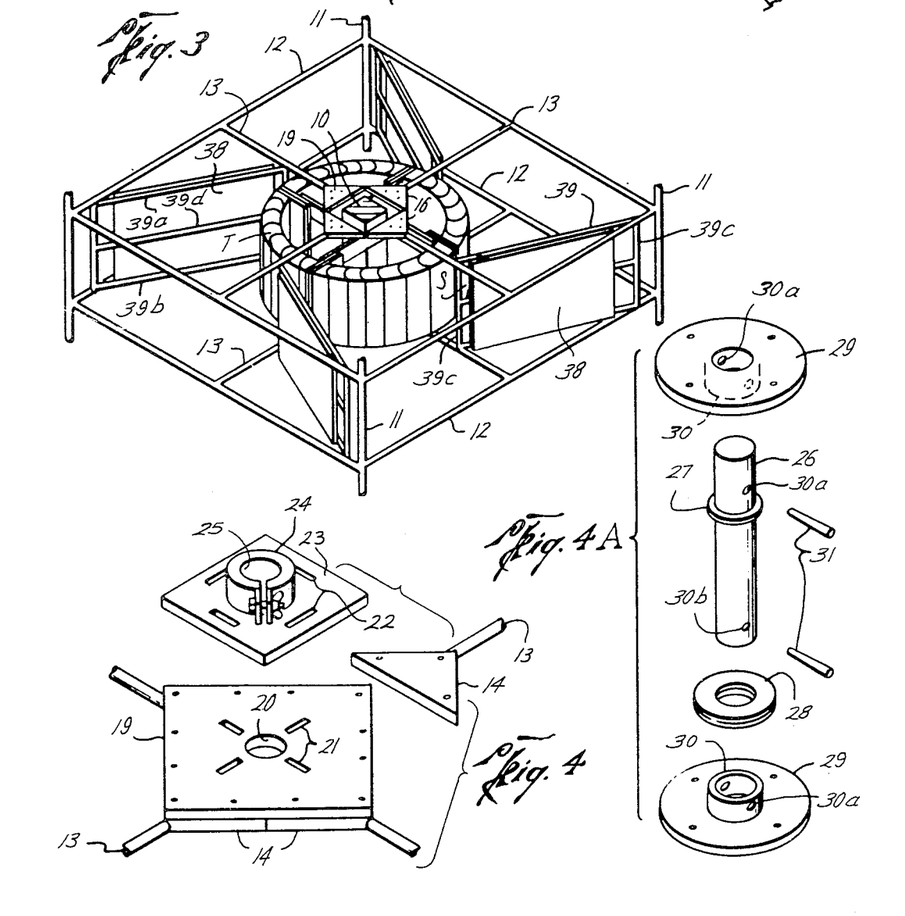
FIG. 3 is an isometric view of the driving vane unit and its coacting deflector panel members.
FIG. 4 is an isometric view of the parts forming the support plate for the turbine and also showing the base plate and bearing collar which is secured to said support plate.
FIG. 4A is an isometric exploded view of the shaft and its associated parts which are adapted to be combined with the parts shown in FIG. 4 to form one of the bearings for the shaft of the structure.
Figure 5:
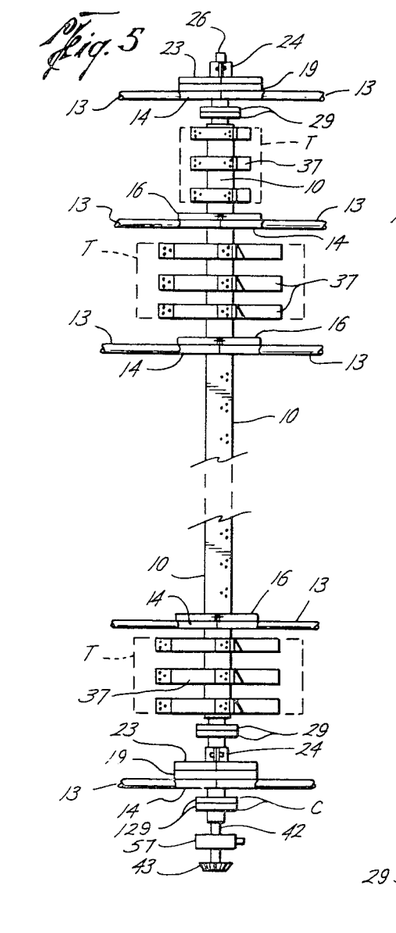
FIG. 5 is a partial view illustrating the mounting of the turbine units on the shaft and also showing the upper and lower bearing supports for said shaft.

The supporting structure is of an open type, derrick-like construction. The inner tower A-1 being of a square shape in cross-section. It includes the vertical corner legs 11 and stabilizing braces 11a secured to the lower end of said legs and provided with foot pieces B engaging the ground. The legs are connected by side members 12 which are spaced vertically from each other a distance sufficient to accommodate a turbine assembly T. The four side members 12 which lie in the same horizontal plane are connected by cross members 13 and each section of members 12 and 13 may be referred to as a set; together, they form a portion of a base or support for each turbine within the inner tower. As shown in FIG. 3, each turbine assembly T is located between the spaced sets of the side members.

The outer tower A-2 of the supporting structure is primarily a reinforcing arrangement and consists of a number, usually four, of inclined generally vertical legs 11A which are included to provide a wider base for the structure and which are connected by cross elements 11B at their upper ends. The upper portions of the inclined legs are connected to the upper end of the inner tower while the remainder of said legs have a suitable number of horizontal cross or connecting members 11C which are attached to the vertical corner posts 11 of the inner tower. As previously noted, the lower ends of the inclined legs 11A have foot pads B engaging the ground.

Figure 12:
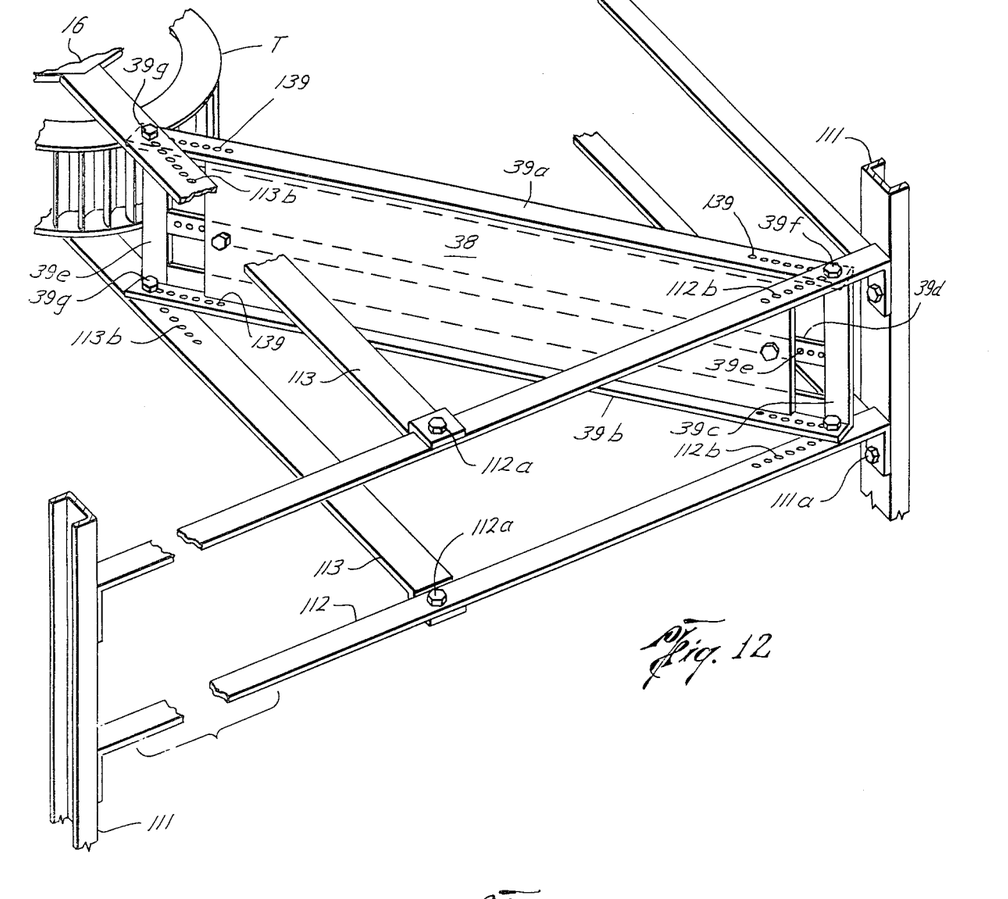
FIG. 12 is a partial isometric view of the mounting of the deflector panels or sails and showing the structural members of the tower as angle or flat elements, as distinguished from tubular elements illustrated in FIGS. 1 and 3.
Figure 13:
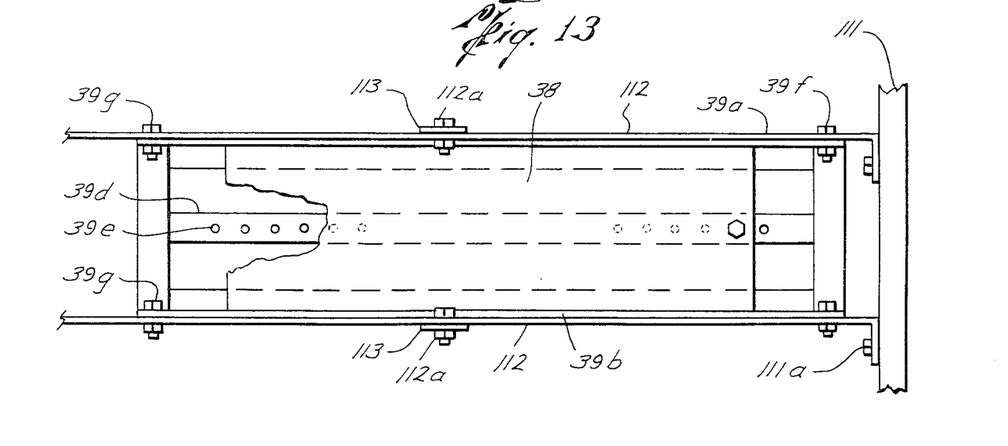
FIG. 13 is a side elevation of the structural element shown in FIG. 12.

In FIGS. 1 through 9, the members of the tower structures are shown as tubular or cylindrical, in which case they would be welded or otherwise secured to each other. However, the members forming the supporting structure can vary and may be constructed of channel and angle bars, I-beams or flat metal elements as desired. In fact, this latter construction may be preferable and is illustrated in FIGS. 12 and 13.

THE BEARINGS AND TURBINES SUPPORT

Figure 8:
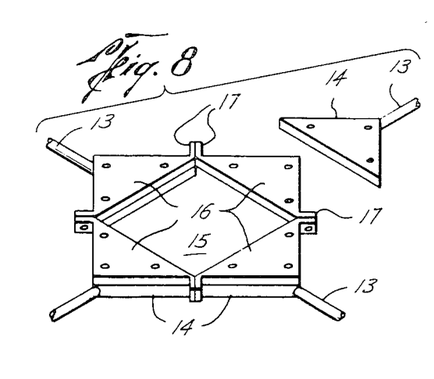
FIG. 8 is an exploded isometric view of the intermediate support assembly which is disposed between the turbine units.

For connecting each set of side members which are located in the same horizontal plane and also for providing the support for the turbine assemblies T, the cross members 13 are secured centrally of the side members 12 and extend inwardly toward the center of the inner tower. Each cross member 13 has a triangular shaped support segment 14 secured to its inner end, as best seen in FIG. 8 and when the four cross members 13 located in the same horizontal plane are in proper position, their inner peripheries form a square opening 15. The support segments 14 are then secured together by connecting segments 16 which are of the same shape but which have flanges 17 for attachment to each other by bolts 18. Thus the connected segments form a flat support at the center of the inner tower, which support is carried by cross members 13 and is located in the same horizontal plane as both the cross members and the side members 12. As noted, these supports have the square opening through which the one piece shaft 10 extends.

Figure 9:
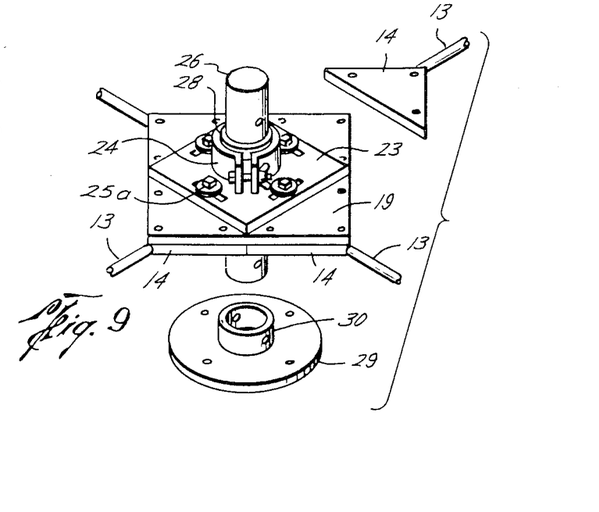
FIG. 9 is an isometric exploded view of one of the bearing supports of the turbine shaft.

As shown in FIG. 4, the uppermost set of cross members 13 and the lowermost set of said cross members have their segmental sections 14 combined with a solid plate member 19. This solid plate member has a central circular opening 20 and the plate is secured to the four segments 14 of the four cross members 13. The plate is formed with radial slots 21 which will align with slots 22 formed in a base member 23 which overlies and is secured to the plate 19. The base member 23 has an upstanding bearing collar 24 provided with a bore 25 adapted to be aligned with the circular opening 20 in said plate. The slots 22 in the base plate 23 register with slots 21 in the plate 19 and suitable bolts 25a, as shown in FIG. 9, extend through said aligned slots; the slots provide for necessary adjustment so that the bore 25 may be axially aligned with the opening 20 in plate 19.

The parts shown in FIG. 4A will complete the bearing assembly and such parts include a relatively short stub shaft 26 having an enlarged flange 27 near its upper portion. A bearing ring unit 28 slides onto the lower end of shaft 26 and into an internal annular countersunk groove (not shown) in the lower portion of the bore of the collar 25. As is well known, the bearing ring unit includes inner and outer rings between which bearings are confined and when the collar 24 is tightened about the bearing ring unit and shaft, said shaft may rotate with minimum frictional resistance. A connecting disc or plate 29 is adapted to be secured to the lower end of the stub shaft 26 by tapered pins 31 which extend through aligned openings 30a in the collar 30 of the disc member and 30b in the lower end of the shaft.

Figure 6:
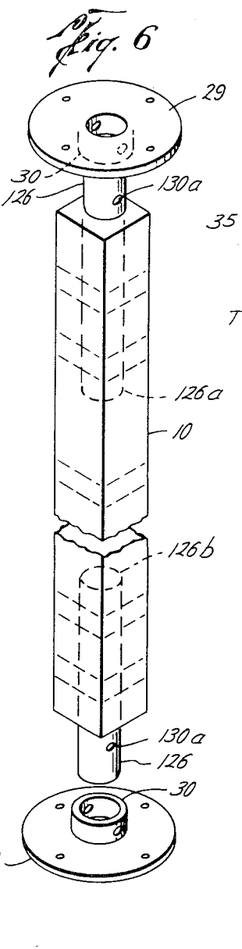
FIG. 6 is an isometric view of the main shaft to which the turbine units are connected.

The main one-piece drive shaft 10 is shown in FIG. 6 and is preferably square in cross-section. Its upper portion has a shaft 126 which extends into a bore 126a formed in shaft 10. A connecting disc 29 is secured to shaft 126 by means of a tapered pin which engages aligned openings 130a in the shaft and openings 30a in the disc collar 29. The discs 29 of the bearing assembly and the shaft are adapted to be secured together and the shaft 10 rotates with minimum friction by reason of connection to the stub shaft 26 rotating within the bearing assembly.

The lower portion of the main drive shaft 10 also has a similar downwardly extending shaft 126 projecting from a bore 126b in said shaft. A connecting disc 29 is mounted on the lower end of the shaft through aligned openings 130a and 30 connected by a tapered pin such as tapered pins 31.

Figure 10:
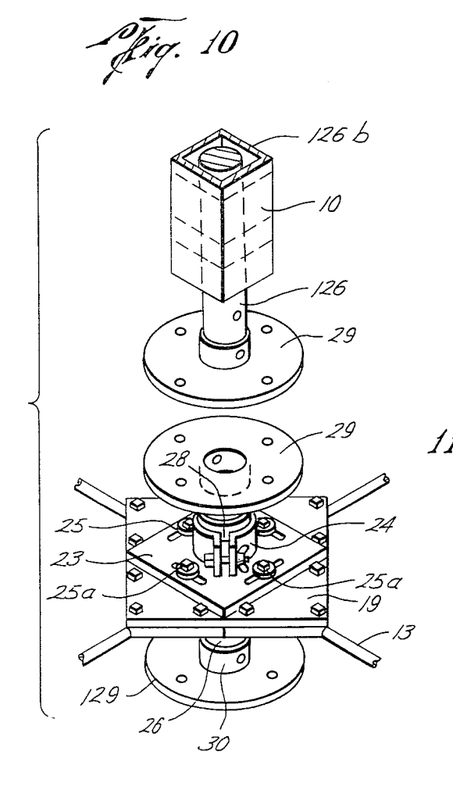
FIG. 10 is an exploded view of the lower bearing assembly for the one piece shaft.

The lower bearing assembly for the shaft is shown in FIG. 10 and is a substantial duplicate of the assembly shown in FIG. 9 with the addition of another upper connecting disc. Such lower bearing assembly has a lower connecting disc 29 and an upper connecting disc 29 with the upper disc being secured to the lower disc 29 of the main shaft. The lower disc 29 of the lower bearing assembly is connected to a disc 129 of the connection C to drive the shaft 32 of the apparatus or machinery D at the base of the tower.

The two bearing assemblies are so constructed that the parts are interchangeable and it is only necessary to provide the additional connecting discs 29 for the lower connection to make all necessary connections. Although it is desirable to have interchangeable parts, it is not absolutely necessary and any suitable connection or bearing support for the shaft may be provided.

THE TURBINE ASSEMBLY

The turbine assembly T is best shown in FIGS. 2, 3, 7 and 11 and includes a central circular shaped turbine unit 34 having multiple vanes 35. Although the specific construction of the turbine is subject to variation, it is preferable that it be constructed in the manner shown in FIG. 11. Because the diameter of the turbine will be relatively large, for example in the order of twenty feet, it is desirable to construct the turbine in quarter sections which are welded, bolted or otherwise secured to each other. Each quarter section includes a plurality of vertically disposed driving vanes 34 which are curved in cross-section to form a wind scoop. The curvature of each vane is such that the wind which impinges upon the curved surface rotates the turbine in the desired direction and then escapes from the area between the vanes into the central interior of the turbine from where it flows upwardly to atmosphere. The rotation of the turbine creates an internal vortex which encourages such flow of the air passing through the turbine.

Figure 11:
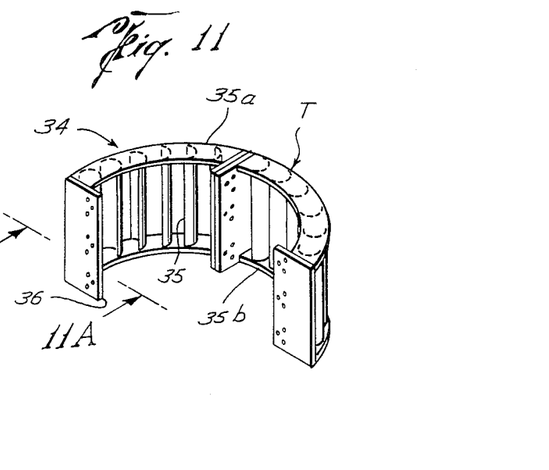
FIG. 11 is an isometric view of two of the sections of the turbine unit T.
Figure 11A:
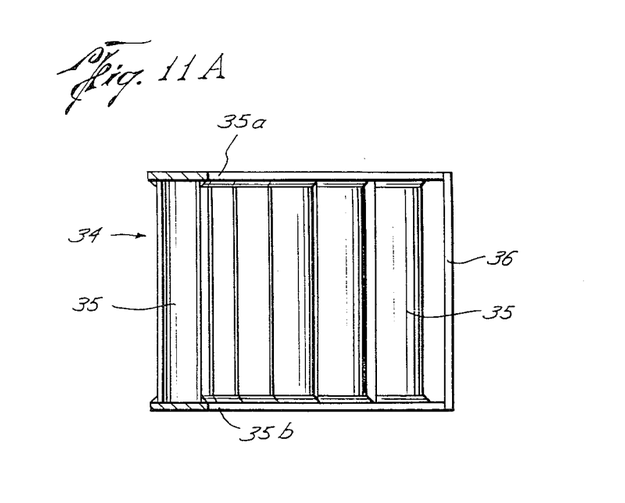
FIG. 11A is a sectional view taken on the line 11a—11a of FIG. 11.

For connecting the quarter sections of turbine vanes to each other, each quarter section has a vertical connecting flange 36 at its extremity and when the sections are in abutting relationship, they form an annular structure of driving vanes with adjacent flanges 36 in contact with each other. Suitable bolts may be used to connect the quarter section flanges or said flanges may be welded. After the quarter sections are secured, an annular top plate or ring 35a overlies all of the upper ends of the driving vanes and is suitably welded in place to close the spaces between the upper ends of the vanes. The spaces between the lower ends of the vanes is closed by a bottom generally annular plate or ring 35b which is welded or otherwise secured to the lower end of said driving vanes.

Figure 7:
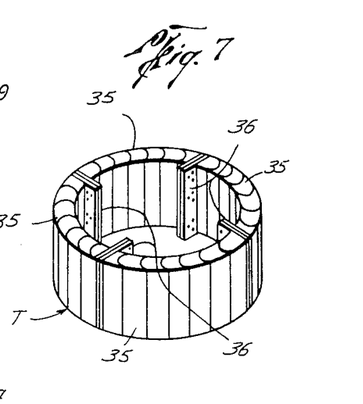
FIG. 7 is an isometric view of the turbine vane assembly.
Figure 7A:
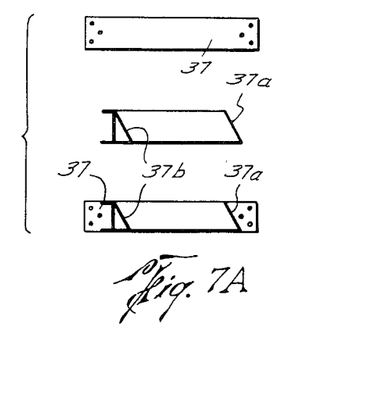
FIG. 7A is a side elevation of the connecting members which connect the turbine vane assemblies to the shaft.

Each vane unit is attached to the square shaft 10 by four sets of fastening straps 37 with each set including three straps (FIG. 7A). Each set of three straps extends between one of the connecting flanges 36 and one of the flat exterior surfaces of the square shaft. Suitable bolts fasten the turbine unit to the shaft (FIG. 5) and therefore, when the turbine unit is rotated, the shaft 10 is rotated.

In some instances, it may be desirable to enhance the vortex which is developed by the rotating turbine, and this can be accomplished by providing an irregularity in the form of a wedge member 37a, as shown in FIG. 7A. The wedge member is actually a strap provided with wedge shaped protuberances 37b extending outwardly from the side of strap 37. The middle view in FIG. 7A shows the additional member, while the lower view of FIG. 7A shows the strap 37 combined with the wedge member 37a. When the wedge member is employed, the rotation of the turbine will cause wedges to start a vortex updraft and this will assure that the volume of air passing through the driving vanes will exit from the upper end of the turbine.

THE DEFLECTOR PANELS OR SAILS

Generally the turbine-type windmill is exposed to the wind so that such wind will strike the windward side of the turbine and although some attempts have been made to control the manner in which the wind acts upon the vanes of the turbine, none have been particularly successful. In the present invention, the wind which will strike the turbine is controlled and is directed to desired areas of the vanes of the turbine unit while other areas of said vanes are protected from the wind.

Figure 2:
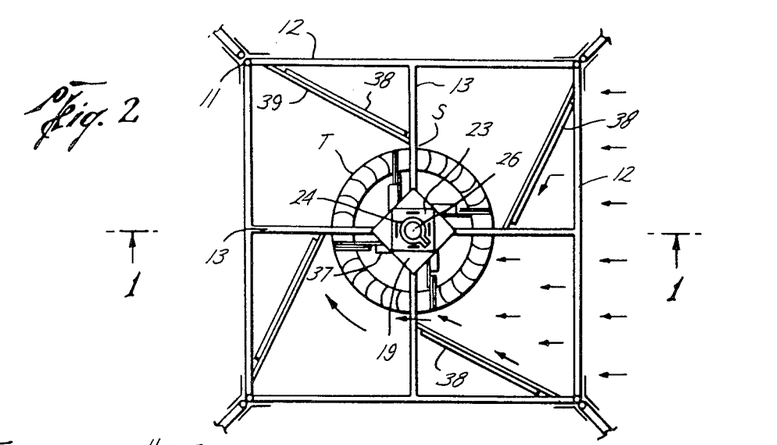
FIG. 2 is a plan view of the improved turbine unit, together with the deflector panels or sails which complete the turbine unit assembly.

As shown in FIGS. 2 and 3, the control of the wind which will act upon certain vanes of the turbine unit is accomplished by the use of deflector panels or sails 38. The deflector panels or sails are generally rectangular in shape and are secured to a frame 39 which extends between a point 40 adjacent one leg 11 of the inner tower to a second point 41 adjacent the vane unit where it is supported by two of the cross members 13 of said inner tower. The frames 39 and the panels or sails carried are adjustable to different angles so that the space designated S in FIG. 2, which is the space between the inner vertical edge of each sail or panel and the turbine vanes, may be varied. By varying such space, the volume of air which may pass between each panel or sail and the periphery of the vane unit will be changed.

In addition to the adjustment of the frame 39, each deflector panel or sail 38 may be moved relative to its frame in a longitudinal or horizontal direction, whereby even though the angle of the panel with respect to the vane unit is not changed, the space S between the inner vertical edge of the panel or sail with respect to the vane unit may be varied. The particular spacing and angle of the panel with respect to the turbine vanes controls the volume of air acting upon the vanes as well as the volume of air which bypasses the panel or sail. Such control of air volume will control the rotative speed of the unit and obtain maximum efficiency from the turbine unit.

In FIG. 2, the effect of the wind acting upon the turbine as controlled by the deflector panels or sails is illustrated. With the wind moving in the direction of the arrows W, such wind will strike the upper right-hand sail as viewed in FIG. 2 and will be directed downwardly toward the lower right-hand sail, also as viewed in FIG. 2. Because of the particular inclination of the latter sail, the air will be directed into the peripheral portion of the vanes of the rotating turbine. If the volume of air attempting to act upon the turbine in the area S where the sail is closest to the turbine becomes too great and is restricted, there will be a tendency for the air to "stack", and cause a turbulence which results in some of the air acting upon the turbine vanes in the wrong direction. Because there is the space S provided between the inner vertical edge of the sail and the vanes, the excess air may escape and bypass into the next section of the tower. In such case, this escaping air strikes the next sail which is on the lower left as viewed in FIG. 2 and is trapped by this sail which then directs such air back against the vanes to assist in applying rotative force to the turbine.

It is thus evident that by proper angular adjustment of each sail or deflector panel, as well as by the horizontal adjustment of each sail, on its frame, the spaces S function to accurately control the air volume directed against the proper area of driving vanes of the turbine unit 35. This produces maximum efficiency of turbine operation to thereby obtain maximum power from the available wind to rotate the drive shaft 10 which performs the desired work.

Although the shaft 10 may be utilized for any purpose, it is illustrated as driving the machinery or apparatus D. The rotation of the turbine units is transmitted to said shaft 10 which is coupled through connection C at its lower end to a drive shaft 42. The connection C comprises the lower disc 29 which is mounted on the lower end of the shaft 126 of the main drive shaft 10 (FIG. 10). This disc is secured to a similar disc 29 attached to the upper end of shaft 42. Shaft 42 has a drive gear 43 which is in constant mesh with bevel gears 44 and 45. The apparatus which is actuated by the bevel gears 44 and 45 is the type of apparatus or machinery used to control the torque energy developed by the rotating turbines. Similar apparatus is used with other forms of energy and is well known in the mechanical art. Specifically, the torque is taken from the turbine operation through the gears 44 and 45. Under normal conditions, gear 45 is an idler, while gear 44 is directly connected to a gear train at 46; gear train operates the hydromatic or mechanical torque converter clutch indicated at 47 and the fly wheel 48. The generator which is operated by means of the torque is shown at 49.

In the event that the fly wheel 48 and attached generator 49 exceed a desired operating speed, the shaft 50, with governor control torque converter clutch attached, as indicated at 51, engages the gear train 52, with attached torque converter clutch 53; in turn, engagement with an accumulator fly wheel 54 is made with the connected gear train 55 and generator 56. The duration of engagement of the governor control clutch 51 to the gears, fly wheel and generator is for the period of time that the fly wheel 48 has the tendency to exceed desired operating speed. Additional generators may be connected to the train as needed to control the operating speed by their torque usage drag. A suitable brake 57 is mounted at the lower portion of the shaft.

The apparatus just described which includes the torque converter and the related elements, is housed within the housing H and since said apparatus is well known, further detailed explanation is believed to be unnecessary.

THE MODIFIED SUPPORT STRUCTURE

As has been noted, the support structure is illustrated in FIGS. 1 through 9 as constructed of tubular members or rods, although other structural elements may be employed. In FIGS. 12 and 13 is shown a portion of the inner tower and one of the adjustable deflecting panels or sails, wherein structural elements bolted together are used.

Referring specifically to FIG. 12, the upright corner legs of the inner tower A-1 are vertical channel members 111. The channel legs are bolted at 111a to side elements 112 which in turn are bolted at 112a to the cross members 113. Each cross member has the segmental plate 14 (not shown in FIG. 12) welded or otherwise secured thereto and said plates form the support for the top and bottom bearing base members 19 (FIGS. 9 and 10) and the intermediate segmental elements 16 (FIG. 8).

Each deflector panel or sail assembly has a structural frame formed of upper and lower horizontally spaced angle bars 39a and 39b which have their end portions connected by an upright element 39c. The element 39c is preferably welded to the angle bars. The central portion of the frame is reinforced by a longitudinally extending flat member 39d which has a plurality of adjustment openings 39e at each end portion thereof. The deflector panel or sail 38 is shorter in length than the frame and the central reinforcing member 39d and may be adjusted horizontally within the supporting frame by utilizing the series of openings 39e in the central reinforcing member, which will attach the panel in various positions within the frame. Such adjustment changes the space S between the inner vertical edge of the panel 40 and the turbine unit T.

To permit changing the angle of the sail or deflecting panel 38 with respect to the periphery of the turbine T, the side members 112 are formed with a plurality of openings 112b which are located at those ends of the side members which are adjacent to the corner legs 111. The inner portion of each cross member 113 is provided with a plurality of spaced openings 113b, such openings being similar to the openings 112b in the side members.

As shown in FIG. 12, the outer end of the frame formed by the angle bars 39a and 39b to which the panel or sail 38 is attached are bolted by bolts 39f to the side bars through one of the openings 112b, each of said bolts also extending through one of a series of adjustment openings 139 provided in said angle bars 39a and 39b. The opposite end of the frame which is adjacent to the turbine T has its lower angle bar bolted with bolt 39g to the cross member 113 through one of the openings 113b and also through one of a plurality of adjustment openings 139 formed at the inner end portion of the lower angle bar of the frame. Upper angle bar 39a is bolted with bolt 39g to cross member 113 through one of the openings 113b and also through one of the plurality of adjustment openings formed at the inner portion of the upper angle bar of the frame. With this structural arrangement, the angle of the deflector panel or sail with respect to the turbine unit T may be varied in accordance with the particular openings which are employed in bolting the angle frame bars 39a and 39b to the side members 112 and the cross member 113. This angular adjustment together with the adjustment of the panel 38 within its frame will vary the space S to control the volume of air being directed to the driving vanes of the turbine units T.

OPERATION

Figure 1:
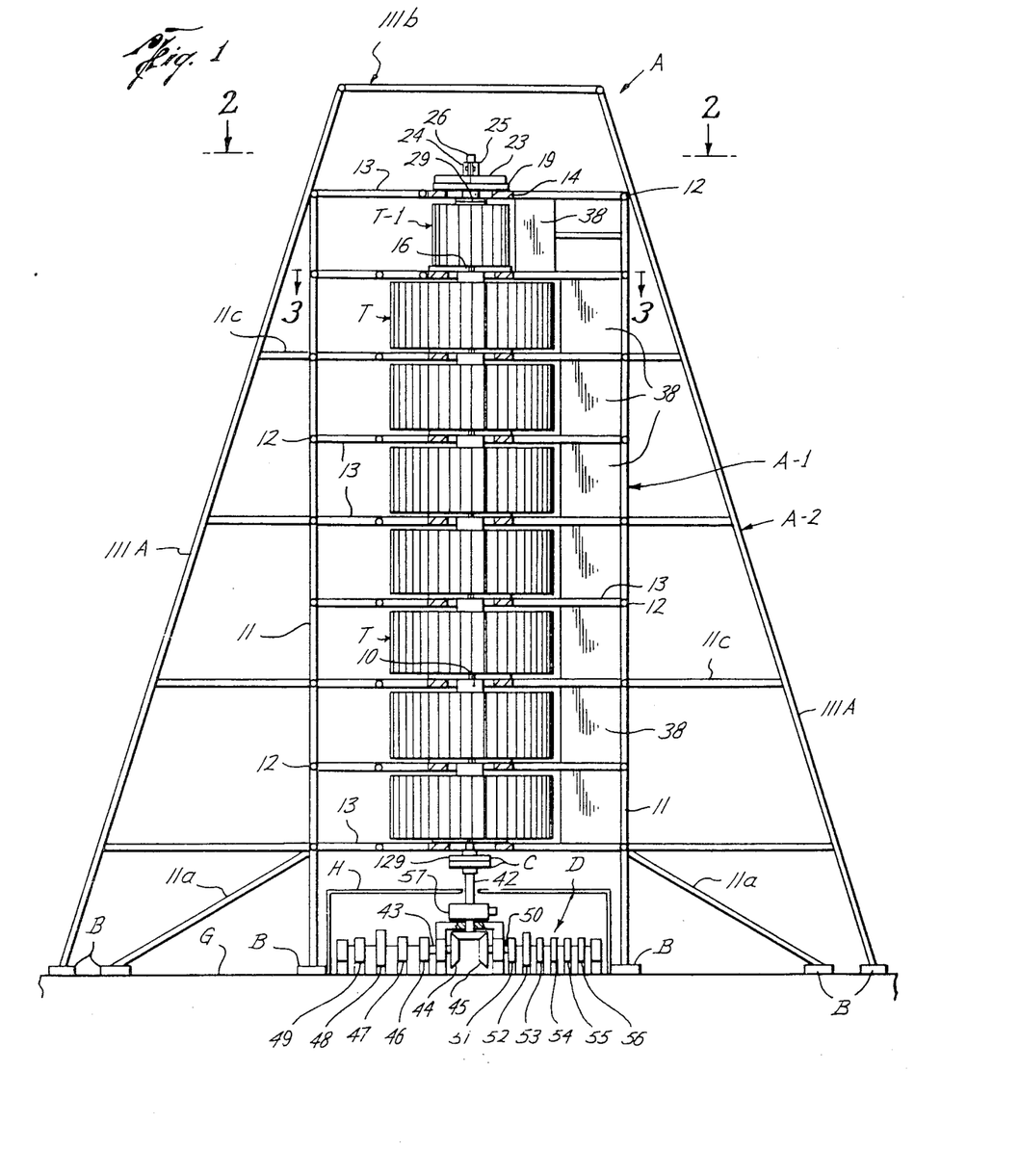
FIG. 1 is a side elevation of a wind machine having a single shaft driven by a plurality of turbine units, said wind machine being constructed in accordance with the invention.

In operation, it is ordinarily desirable to superpose a group of turbine assemblies T in the manner illustrated in FIG. 1. Usually, the diameter of the turbines of such assemblies is the same but in some instances, it may be desirable to employ a smaller size turbine assembly such as shown as the uppermost assembly T-1 in FIG. 1. The tower structure and arrangement lends itself to readily accommodating any size turbine assembly.

The wind machine is, of course, located in a known geographical location where the wind conditions are known and fairly well predictable. The sails or deflector panels 38 are adjusted with respect to the turbine units T so that the bypass space S between each panel and the periphery of the turbine unit is proper to prevent stacking of the air and to allow proper bypass of air into the next section of the turbine unit.

As the wind blows in the direction of the arrows W in FIG. 2, it will strike approximately one quarter section of the turbine unit T. It will, of course, also encounter the sail or deflector panel 38 at the upper right-hand portion of FIG. 2 and such panel will deflect the wind into the area of those vanes which are to receive the wind power. As the turbine rotates an internal vortex is created and the air volume which has acted upon the driving vanes of the turbine will pass to the interior of the turbine unit T and will then escape upwardly. Some of the air which is directed against the driving vanes of the turbine will pass through the space S where it will encounter the sail or deflector panel 38 at the lower left-hand side of FIG. 2. This sail will capture some of this air and again direct it into the driving vanes so that the wind is not wasted but continues to act upon the driving vanes in the proper direction.

At the same time that the sails 38 are directing the wind force to the driving vanes, certain of said sails are protecting the vanes from being contacted by the wind in the wrong direction. For example, the sail 38 in the upper right-hand corner of FIG. 2 will prevent the wind from acting against the driving vanes in a direction which would tend to rotate the turbine in the undesired direction. Therefore, it is evident that the sails or deflector panels 38 can be adjusted to properly direct the force of the wind to the driving vanes and thereby obtain maximum efficiency of operation.

As noted, any desired number of turbine assemblies may be employed and, of course, the tower height is subject to variation in accordance with the number of turbines which it is desired to accommodate. The main drive shaft 10 is a one-piece shaft which is mounted in the upper and lower bearings as described. The shaft may be of any size within the limits of the openings through the various turbines and may be utilized to drive any type of apparatus.

What is claimed is:

1. A wind machine comprising.
   a vertically extending support structure formed of an open framework through which the wind can freely pass,
   a vertical shaft disposed centrally of said structure,
   a turbine assembly mounted upon the support structure and exposed to the wind, which may blow through the framework, said turbine assembly including
   (a) a rotatable turbine unit having driving vanes, and
   (b) a plurality of deflector panels spaced peripherally about the turbine unit, with each panel being disposed at a generally tangential angle with respect to the periphery of the turbine unit and its driving vanes and extending from the outer limits of the support structure to a point adjacent to the periphery of the turbine,
   each panel when in the path of the wind direction acting to direct the wind which strikes the panels to deflect, channel and concentrate the wind flow to selected driving vanes of said unit and thereby impart rotation to the unit,
   means mounting each panel for individual angular adjustment with respect to the vanes of the turbine,
   additional means for mounting each panel for individual independent movement between the inner vertical edge of each panel and the periphery of the turbine unit to thereby control the wind flow passing between the said inner vertical edge of the panel and the periphery of the turbine unit,
   means connecting the turbine unit to said vertical shaft which extends within the support structure, and
   apparatus located at the lower end of the support structure and having connection with the vertical shaft, whereby said apparatus is driven by said shaft which is rotated by the turbine unit.

2. A wind machine as set forth in claim 1, wherein each deflector panel of the turbine assembly is of general rectangular shape, is disposed in a vertical plane and has a height substantially the height of the turbine assembly.

3. A wind machine as set forth in claim 1 wherein at least two deflector panels are located on the windward side of the turbine assembly with one of said panels disposed to protect the trailing sides of the vanes of the turbine unit from the wind and at the same time direct the wind toward the deflector panel which in turn directs the wind into those sides of the turbine vanes functioning to rotate said turbine unit in the desired direction.

4. A wind machine as set forth in claim 1, together with
   at least one additional turbine assembly superposed upon said first turbine assembly and also mounted upon the support structure, and
   means for connecting the additional turbine assembly or assemblies to the vertical shaft whereby said apparatus at the lower end of the support structure is driven by all turbine assemblies.

5. A wind machine as set forth in claim 1 wherein the vertical shaft is a one-piece shaft which is angular in cross section,
   upper bearing means mounted on the support structure and engaging the upper end of said shaft, and
   the lower bearing means also mounted on the support structure and engaging the lower portion of the shaft and located above the connection between the shaft and the driven apparatus.

6. A wind machine as set forth in claim 1, wherein said support structure is formed of
   (a) an inner vertically extending tower which is substantially square in cross-section and which is constructed of interconnected spaced apart members providing an open-type structural tower, and (b) an outer open-type structural tower also constructed of interconnected members which are connected to said inner tower, said outer tower having its main supporting members generally inclined with its base wider than its top to assure adequate support of said inner tower.

7. A turbine unit assembly for the vertical shaft of a wind machine as set forth in claim 1 wherein each deflector panel is constructed of a rigid material and is disposed in an upright vertical position, each panel being located so that its inner vertical edge is spaced from the periphery of the turbine unit, and additional means for individually adjusting each panel in a horizontal plane to vary the spacing of said inner vertical edge of each panel with respect to the turbine periphery in accordance with wind conditions to control the volume of air by-passing the turbine blades.

* * * * *